METHOD OF GEOPHYSICAL EXPLORATION

Filed May 2, 1950 3 Sheets-Sheet 1

INVENTORS
AXEL RUDOLF LINDBLAD, (DECEASED),
BY STAFFAN SERRANDER, ADMINISTRATOR,
JOHAN DAVID MALMQVIST AND
GOTTHARD VIKTOR ARNOLD GUSTAFSSON
BY Stevens, Davis, Miller and Mosher
ATTORNEYS

METHOD OF GEOPHYSICAL EXPLORATION

Filed May 2, 1950 3 Sheets-Sheet 2

INVENTORS
AXEL RUDOLF LINDBLAD, (DECEASED),
BY STAFFAN SERRANDER, ADMINISTRATOR,
JOHAN DAVID MALMQVIST AND
GOTTHARD VIKTOR ARNOLD GUSTAFSSON
BY Stevens, Davis, Miller and Mosher
ATTORNEYS Oct. 31, 1950 A. R. LINDBLAD ET AL 2,527,559

METHOD OF GEOPHYSICAL EXPLORATION

Filed May 2, 1950 3 Sheets-Sheet 3

INVENTORS
AXEL RUDOLF LINDBLAD, (DECEASED),
BY STAFFAN SERRANDER, ADMINISTRATOR,
JOHAN DAVID MALMQVIST AND
GOTTHARD VIKTOR ARNOLD GUSTAFSSON

BY Stevens, Davis, Miller and Mosher
ATTORNEYS

Patented Oct. 31, 1950 2,527,559

UNITED STATES PATENT OFFICE 2,527,559

METHOD OF GEOPHYSICAL EXPLORATION

Axel Rudolf Lindblad, deceased, late of Djursholm, Sweden, by Staffan Serrander, administrator, Stockholm, Sweden, Johan David Malmqvist, Boliden, and Gotthard Viktor Arnold Gustafsson, Akeshov, Sweden, assignors to Bolidens Gruvaktiebolag, Skelleftehamn, Sweden, a joint-stock company limited of Sweden Application May 2, 1950, Serial No. 159,432
In Sweden October 10, 1942

2 Claims. (Cl. 175—182)

1

This is a continuation-in-part of our application Serial No. 611,614, filed August 20, 1945.

This invention relates to a method and apparatus for use in geophysical prospecting and particularly to an electrical method and apparatus for the location of ore bodies beneath the surface of the earth.

It has been common practice heretofore to attempt to locate subterranean ore bodies electromagnetically by generating an electromagnetic field, passing that field through a portion of the earth's surface and subsequently measuring the effect on that field of subterranean ore bodies.

In previous electromagnetic methods, and with previous apparatus, it has been common to start with an alternating electrical current of sine wave form, or the form that approximates a sine wave. This electrical current has then been passed through an electrical coil to generate an electromagnetic field, which of course is then also of sine wave form. The electromagnetic field has then passed through the earth's surface so as to strike the subterranean ore body. This caused the subterranean ore body to generate a secondary electromagnetic field which has been detected at the surface, usually by another electrical coil, and from the electrical current caused by this detection, efforts have been made to locate the subterranean ore body or bodies.

In almost all of these previous arrangements the detecting coil has detected not only the secondary electromagnetic radiation from the ore body or bodies but has also detected an appreciable proportion of the primary electromagnetic field, and hence the problem of separating the resulting indications has been extremely difficult. Furthermore, in many cases the primary electromagnetic field impinges upon more than one ore body and as a consequence a detecting coil detects electromagnetic fields, including not only the primary electromagnetic field and the secondary field from one of the ore bodies but also other secondary fields from other ore bodies. The result is a very confusing, very complex recording.

It is the purpose of this invention to avoid much of the confusion attendant upon the use of these previous methods. The result of the use of the present method and apparatus is to produce a far more intelligible electromagnetic signal at the detecting coil and this in turn can be converted into a far more intelligible recording.

In accordance with the present invention, a saw-tooth wave generator, or one delivering current varying directly with time, is connected to a primary coil and, of course, so matched that the

2 flow of current through the primary coil is saw-tooth in form and the electromagnetic field generated by the primary coil is saw-tooth in form. Preferably, although not necessarily, the current through the primary coil increases and decreases at exactly the same rate and changes very sharply from an increase to a decrease at the points of the saw-tooth wave. It is, of course, possible to use other currents that vary linearly with time, and not in the strict sense of the definition—saw-tooth currents.

The primary coil is usually placed close to the surface of the earth so that a large proportion of the electromagnetic field generator will penetrate well into the surface. A portion of this field, however, will extend along the surface of the earth to a distant point, where a pickup or detecting coil is placed.

If, for the moment, we ignore capacitance, influences caused by inductance, and resistance and consider the electrical characteristics of the two coils so arranged, we will discover that during the steady increase of current through the primary coil a constant voltage is induced in the secondary coil. Then, upon the steady decrease of current in the primary coil, a constant voltage in the opposite direction is induced in the secondary coil. Only at the time that the direction of current in the primary coil is changed is there any change in voltage in the secondary coil and this is accomplished quite abruptly so that as a result a square wave is induced in the secondary coil.

Now if we consider an ore body or ore bodies lying beneath the surface and subjected to the electromagnetic field of the first coil, we will find that a very similar square wave is induced in these ore bodies, or in their component parts. As a result, each of these ore bodies or each of the component parts of these ore bodies emits a secondary radiation of its own at the moment that the current flow therein is changed. As long as the current therein is constant, however, these ore bodies emit no secondary magnetic radiation, which is detectable with a static coil system.

The detecting coil picks up both the primary magnetic radiation, from which a square wave voltage is induced, and also picks up this secondary radiation or radiations from which only instantaneous surges of current result. As a consequence, if no ore bodies are present the secondary coil picks up only a square wave whereas if ore bodies are present the secondary coil picks up a square wave voltage with small instantaneous voltages superimposed thereon.

If we ignored the time of transmission all of the small instantaneous voltages would appear superimposed upon each other and at the leading edges of the square waves. However, since time of transmission is involved and the distances from the primary coil to the detector coil via different ore bodies are likely to be different, the result is that the small instantaneous voltages are spaced from the leading edges of the square waves and these distances are indicative of the relative distances of travel of the detected waves, and hence indicative of the positions of the ore bodies.

A more complete understanding of the differences between this invention and previous practices and also a better understanding of the advantages of this invention may be obtained by a consideration of the drawings and the following detailed description thereof.

Figure 1:
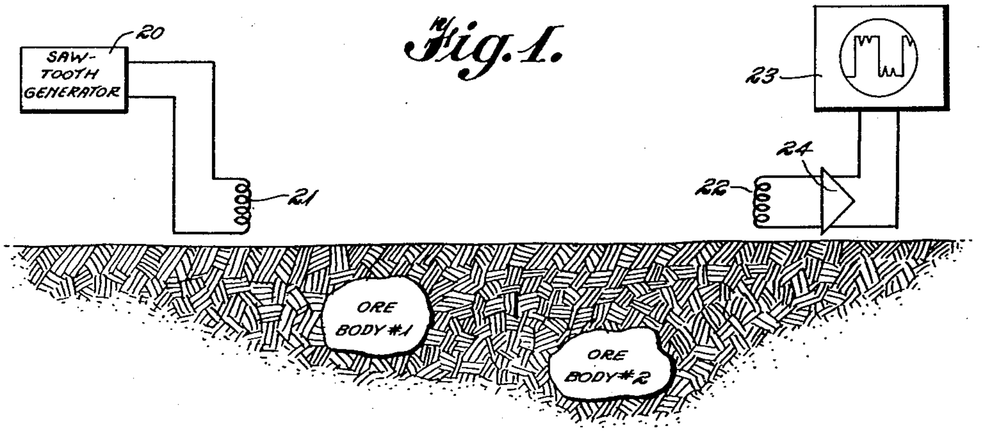
Figure 1 is a diagrammatic illustration of an apparatus for the practice of this invention.

As illustrated in Figure 1, a generator 20 is connected to an induction coil 21 located near the surface of the earth so that the electromagnetic radiation from the coil 21 will penetrate the surface and there strike any subterranean ore bodies such as are indicated as ore No. 1 and ore No. 2. At a remote point there is located a detecting coil 22 that responds to the electromagnetic fields to which it is subjected by generating electrical voltages corresponding thereto. These electrical voltages are introduced to a recorder such as a cathode ray oscillograph recorder shown at 23 so that a record is made thereof in correlation with time. Suitable amplification 24 may be provided between the detecting coil and the recorder.

Figure 7:
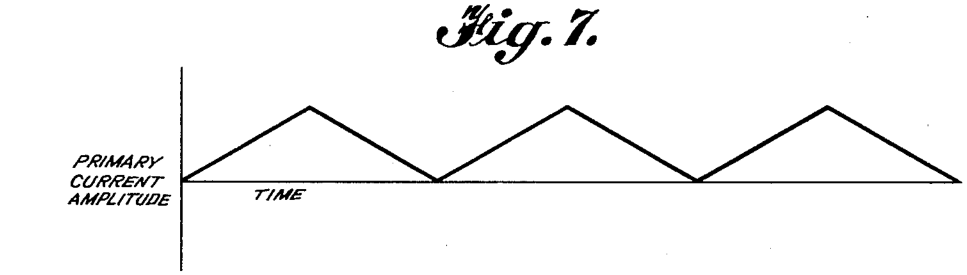
Figure 7 is a curve showing the primary current in the primary coil in accordance with the present invention.

According to the present invention, the generator 20 is arranged and so matched to the induction coil 21 that the current through the induction coil 21 will be saw-toothed in shape as shown in Figure 7. However, let us first consider the effect of the device illustrated in Figure 1 if the generator were arranged to produce a sine wave current in the induction coil 21 instead of a saw-tooth current.

Figure 2:
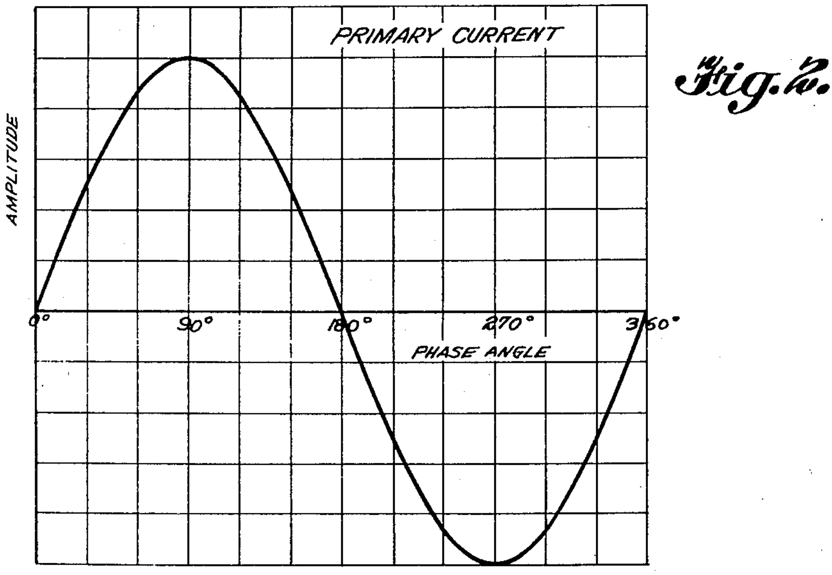
Figure 2 is a current curve for the primary field as generated in accordance with prior practices.
Figure 3:
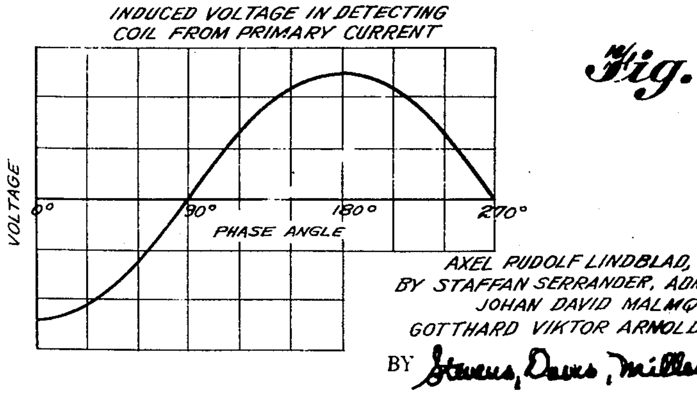
Figure 3 is a curve showing the induced voltage in the detecting coil as a result of the field generated by the primary coil in accordance with prior practices.

Such a sine wave current is illustrated in Figure 2. This current would obviously produce a sine wave electromagnetic field in which the magnetic flux would change in accordance with the changes in current and when this electromagnetic field reached the detecting coil, if we ignore inductance, capacitance and resistance effects, it would set up a voltage in the detecting coil that would be highest at the time the greatest rate of change in flux was occurring and lowest at the time the rate of change of flux in the electromagnetic field was lowest. Thus the induced voltage in the detecting coil would, as shown by Figure 3, be 90 degrees out of phase with the primary current in the primary coil and with the electromagnetic flux in the primary field. It would also be somewhat less in magnitude than the current in the primary coil as illustrated arbitrarily in Figure 3.

Figure 4:
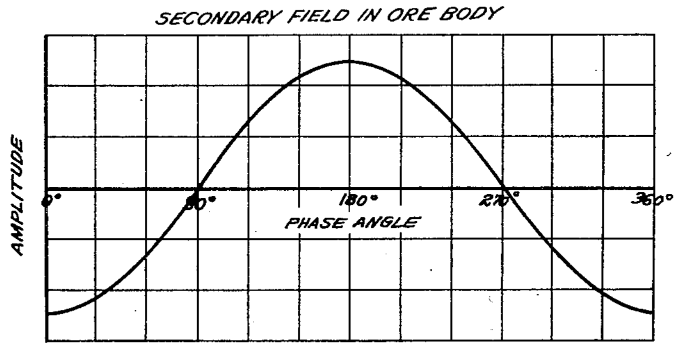
Figure 4 is a field strength curve for the field induced into an ore body by the field from the primary coil in accordance with prior practices.

Now if we consider for a moment the induced voltage or secondary field in the ore body as a result of the primary electromagnetic field we will find that, as shown in Figure 4, this would be similar to the induced voltage in the detector coil. It will also, if the ore body has a high resistivity, be 90 degrees out of phase, neglecting the resistance effects on the current in the primary coil. If the resistivity is lower, the phase displacement lies between 90° and 180°.

Figure 5:
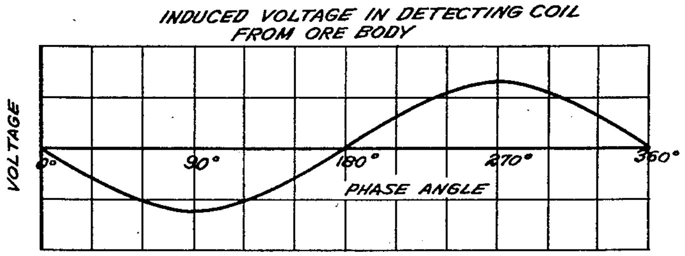
Figure 5 is a voltage curve of the voltage induced in the detecting coil as a result of the secondary field in the ore body in accordance with prior practices.

Passing now to the voltage induced in the detecting coil by reason of the secondary field generated by the ore body, we find, as illustrated in Figure 5, that this induced voltage is shifted another 90 degrees from the current or secondary field in the ore body, and of course is reduced in amplitude.

Figure 6:
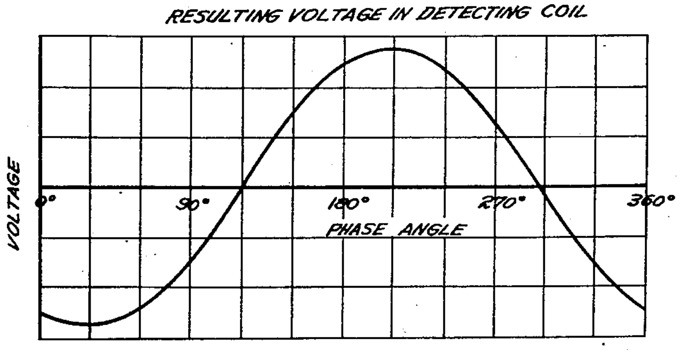
Figure 6 is a composite voltage curve showing the voltage in the detecting coil as a result of the primary and secondary fields in accordance with prior practices.

By combining the induced voltage as shown in Figure 3 and the induced voltage as shown in Figure 5 we arrive finally at the resulting induced voltage in the detecting coil as illustrated in Figure 6. Here we have a rather irregular form of curve that is to form the basis from which indications of the depth and position of ore bodies must be drawn.

Obviously, we have up to this point neglected completely the effect of inductance, capacitance and resistance on the operation of the system and we have neglected the time element that is to form the basis for the final detection of the depth and position of the ore body or bodies under investigation. Obviously, the time that it takes the electromagnetic radiations to pass directly from the primary coil to the detecting coil will displace the curve shown in Figure 3 to the right and the time that it takes the electromagnetic field to pass to the ore body and the secondary field to pass from the ore body to the detecting coil will displace the curve shown in Figure 5 to the right to a different extent. If there are several ore bodies there will be several curves similar to curve 5, each displaced a different distance to the right. By combining all of these displaced curves we will arrive at Figure 6 and the problem will then be to determine the relative displacements indicated by the curve that will be similar to Figure 6 except that it will be modified in accordance with the various time delays.

Such a determination is extremely difficult to make and it is the purpose of this invention to make these determinations much more simply.

Figure 8:
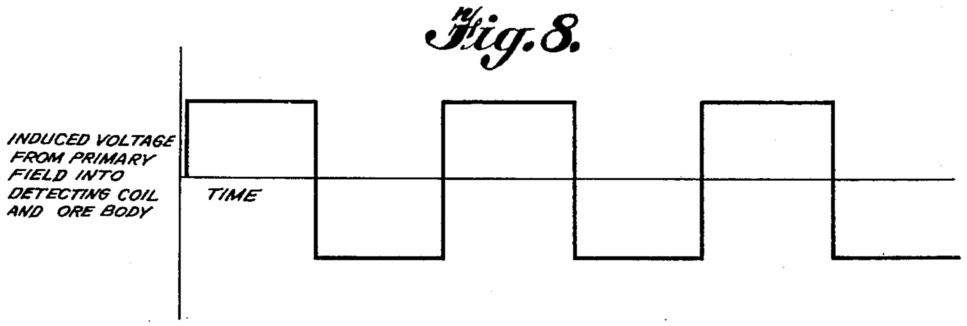
Figure 8 is a curve showing the induced voltage from the primary field into the detecting coil and ore body as a result of the primary field in accordance with the present invention.

Thus, in accordance with this invention, a saw-tooth wave such as is illustrated in Figure 7 is introduced into the primary induction coil 21 by the generator 20. The resulting electromagnetic field, when it impinges upon the detecting coil 22, generates therein a square wave as illustrated in Figure 8, slightly offset in time to the saw-tooth wave of Figure 7. The primary field also induces a similar voltage or field in the ore body or bodies under investigation.

Figure 9:
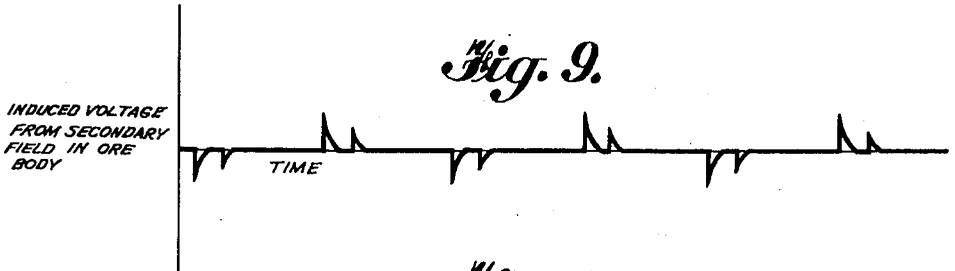
Figure 9 is a curve showing the induced voltage in the detecting coil as a result of the secondary field in the ore body in accordance with the present invention.
Figure 10:
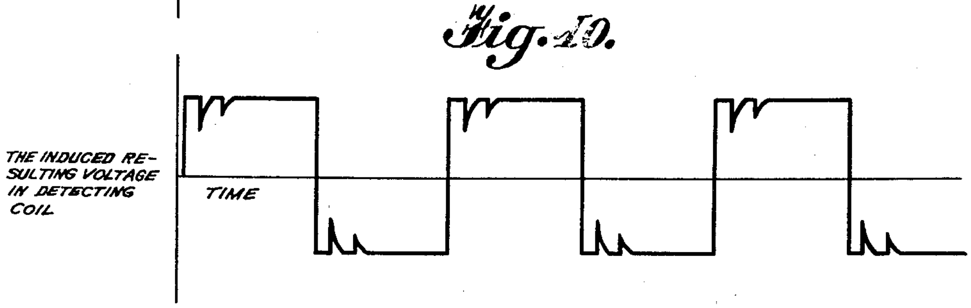
Figure 10 is a composite curve showing the total induced voltage in the detecting coil as a result of both the primary and secondary fields in accordance with the present invention.

As a result of this square wave in the ore body or bodies, these bodies radiate secondary fields momentarily upon the change in current values, as illustrated in Figure 9, and otherwise the ore bodies are inactive in the generation of secondary fields. These secondary fields, in turn, induce momentary currents or momentary voltages in the detecting coil and these are superimposed on top of the square wave induced in the secondary coil by the primary field. As a consequence, the voltage in the detecting coil approximates that illustrated in Figure 10. By reason of the differences in distance traveled by the magnetic field when it passes directly to the detecting coil and when it passes by one or another of the ore bodies, there is a time differential so that the instantaneous voltages do not occur at the leading edges of the square wave and do not occur together unless the paths via the ore bodies are equal in distance. Thus, valuable indications as to location of the various ore bodies are readily obtainable by observation or measurement of the distances between the leading edges of the square waves and the indications of the instantaneous voltages received by the detector coil.

What has been described heretofore is a preferred embodiment of this invention. Other embodiments obvious from these teachings to one skilled in the art are also contemplated as within the spirit of the invention.

What is claimed is:

1. A method of detecting the presence of subterrean ore bodies and the like that comprises introducing into a transmitter coil located near the earth's surface a current varying linearly with time and causing thereby the generation of a primary electromagnetic field of saw-tooth wave form, detecting in a detector coil located at some point distant from said transmitter coil the primary field so generated, simultaneously detecting a secondary electromagnetic field in said detector coil, said secondary field resulting from the impingement of said primary field on ore bodies below the earth's surface and recording in time-spaced relation the two fields so detected.

2. A method of detecting the presence of subterranean ore bodies and the like that comprises introducing into a transmitter coil located near the earth's surface a current varying linearly with time and generating thereby a primary electromagnetic field of a saw-tooth wave form detecting in a detector coil spaced at some distance from said transmitter coil the primary field so generated, said primary field inducing into said detector coil a square wave form of voltage, simultaneously detecting a secondary electromagnetic field in said detector coil, said secondary field resulting from the impingement of said primary field on ore bodies below the earth's surface, said secondary field inducing surges of voltage of short duration in said detector coil, recording in time-spaced relation the current in said detector coil resulting from the said two electromagnetic fields.

STAFFAN SERRANDER.
*Administrator of the Estate of Axel Rudolf Lindblad, Deceased.*
JOHAN DAVID MALMQVIST.
GOTTHARD VIKTOR ARNOLD GUSTAFSSON.

No references cited.